United States Patent [19]

Priem et al.

[11] Patent Number: 5,079,696
[45] Date of Patent: Jan. 7, 1992

[54] APPARATUS FOR READ HANDSHAKE IN HIGH-SPEED ASYNCHRONOUS BUS INTERFACE

[75] Inventors: Curtis Priem, Fremont; Chris Malachowsky, Santa Clara, both of Calif.

[73] Assignee: Sun Microsystems, Inc., Mountain View, Calif.

[21] Appl. No.: 405,543

[22] Filed: Sep. 11, 1989

[51] Int. Cl.⁵ ............................................. G06A 13/12
[52] U.S. Cl. ...................... 395/500; 364/228.4; 364/229.2; 364/239.9; 364/240.8; 364/260.1; 364/270.6; 364/284.4; 364/942.2; 364/DIG. 1; 364/DIG. 2; 395/550
[58] Field of Search .............................. 364/200, 900

[56] References Cited

U.S. PATENT DOCUMENTS 4,809,217  2/1989  Floro et al. ........................ 364/900

FOREIGN PATENT DOCUMENTS 1098890A  1/1968  United Kingdom .
1287657A  9/1972  United Kingdom .

Primary Examiner—Michael R. Fleming
Assistant Examiner—Robert S. Hauser
Attorney, Agent, or Firm—Blakely Sokoloff Taylor & Zafman

[57] ABSTRACT

Handshake circuitry for an asynchronous bus interface system transferring data between first and second computer systems including apparatus for providing signals to indicate to the second computer system that the first system desires to read data at a specified adress of the second system, apparatus for comparing the specified address with addresses of the second system to provide outputs indicating the time required to retrieve data from the specified address, and apparatus operative in response to the output indicating the time required to retrieve data from the second computer to indicate to the first computer system the time at which the information will be available for transfer to the first computer system.

12 Claims, 8 Drawing Sheets

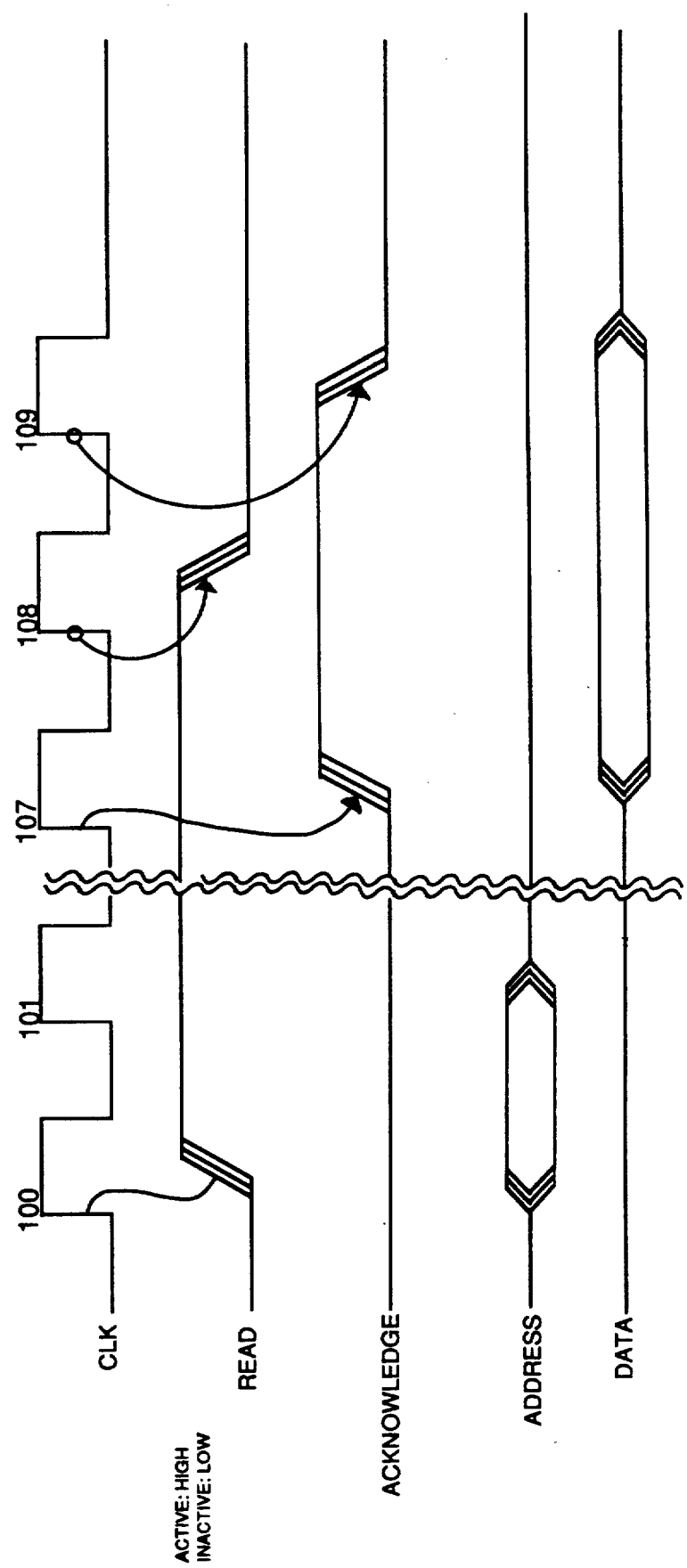

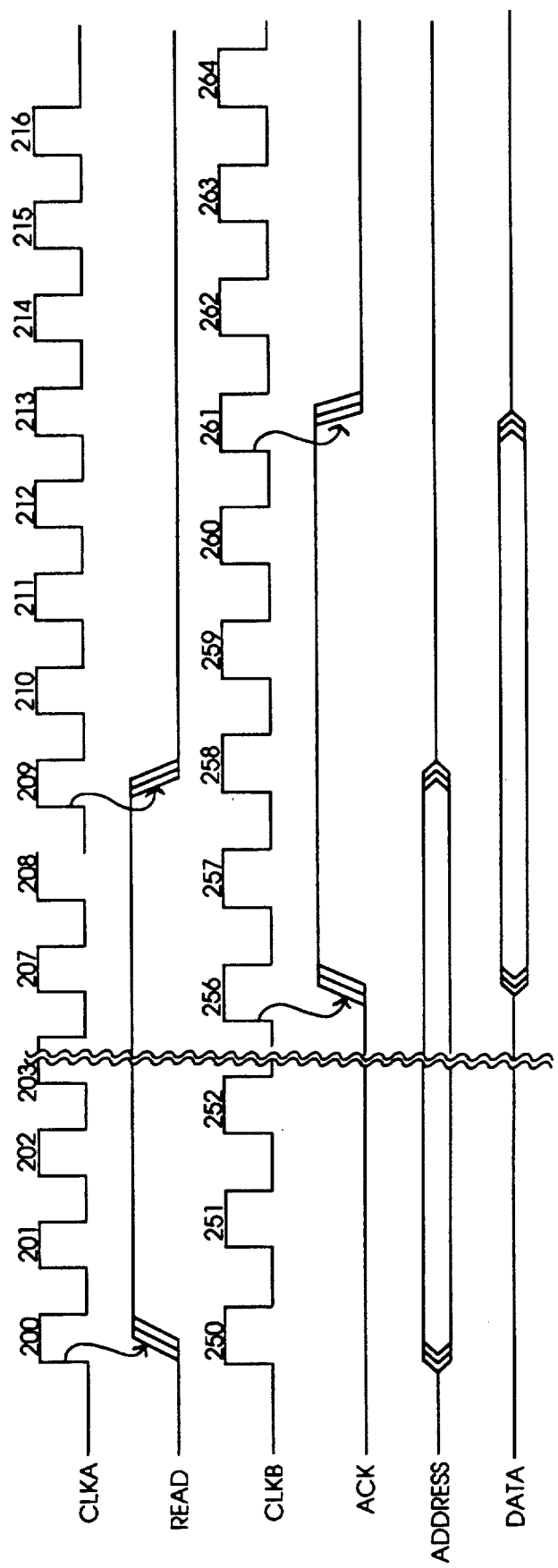

| LINE 44 ACK 80ns | LINE 43 ACK 40ns | LINE 42 ACK 20ns | LINE 41 ACK 10ns | USE ACK | UNKNOWN |
|---|---|---|---|---|---|
| 0 | 0 | 0 | 0 | 0 | |
| 0 | 0 | 0 | 0 | 1 | 10 ns |
| 0 | 0 | 0 | 1 | 0 | 20 ns |
| 0 | 0 | 1 | 1 | 1 | 30 ns |
| 0 | 1 | 0 | 0 | 0 | 40 ns |
| 0 | 1 | 1 | 0 | 1 | 50 ns |
| --- | --- | --- | --- | --- | --- |
| --- | --- | --- | --- | --- | --- |
| 1 | 1 | 1 | 0 | 0 | 140 ns |
| 1 | 1 | 1 | 1 | 1 | 150ns |

FIGURE 3(c)

SYSTEM B

| # CYCLES | 33 ns PER CLK | | | | |
|---|---|---|---|---|---|
| | TIME | 80 | 40 | 20 | 10 |
| 1 | 33 | 0 | 1 | 0 | 0 |
| 2 | 66 | 0 | 1 | 1 | 1 |
| 3 | 99 | 1 | 0 | 1 | 0 |
| 4 | 132 | 1 | 1 | 1 | 0 |

FIGURE 4(a)

| # CYCLES | 43 ns PER CLK | | | | |
|---|---|---|---|---|---|
| | TIME | 80 | 40 | 20 | 10 |
| 1 | 43 | 0 | 1 | 0 | 1 |
| 2 | 86 | 1 | 0 | 0 | 1 |
| 3 | 129 | 1 | 1 | 0 | 1 |

FIGURE 4(b)

APPARATUS FOR READ HANDSHAKE IN HIGH-SPEED ASYNCHRONOUS BUS INTERFACE

BACKGROUND OF THE INVENTION

1. Field of the Invention

This invention relates to computer circuitry and, more particularly, to handshake circuitry at a computer bus interface for connecting asynchronous clocked modules.

2. History of the Prior Art

The typical interface system for transferring information between two computer systems or modules is a synchronous interface system, one in which the two systems are operated by the same clock. Joining the two system is usually a data bus for carrying information, an address bus for carrying addresses, and control lines for accomplishing a so-called "handshake" between the two systems. Normally a write line, a read line, and an acknowledge line are required for transferring signals between the two systems to accomplish the handshake operation.

In the normal synchronous interface where both computer systems are running on the same clock, the computer system wishing to read information from a second system provides a read signal on the read control line during a first clock period. In response to that signal, the second system samples the read line connecting the two systems during a second clock period, finds the data at the address designated and places the data on the data bus during a period defined by the address of the particular data, and finally returns an acknowledge pulse on the acknowledge line to indicate that the data is at the data bus ready to be transferred. Before additional information may be read through the interface system, an additional clock period is necessary to terminate the original read signal, and another clock period to terminate the acknowledge signal.

Since each of the signals on the handshake lines is driven by the system clock, the read handshake operation in a synchronous system where the same clock controls both systems may require as many as four clock cycles. This does not include the time required to obtain the data from the addressed position which varies depending on the address of the data and on the addressed device.

Where the two systems joined by the bus operate at different clock frequencies, it is necessary that the incoming and outgoing handshake signals be synchronized to each of the two systems as they travel in each direction. Consequently, an incoming read signal must be synchronized to the clock of the receiving system while the outgoing acknowledge system must be synchronized to the clock of the sending system. The normal manner in which this is accomplished by the prior art is to use two stages of flip-flops on each handshake line, each stage being driven by the clock of the system receiving the particular signal. The use of two stages of flip-flops to receive the handshake signals adds at least two additional clock periods to each step of the synchronization in an asynchronous interface of the prior art.

There have been asynchronous interface systems designed which utilize various techniques to speed up aspects of the handshake operation. For example, in a write operation where the data is immediately available, multiple pipeline stages may be used to move the synchronization problem from the interface circuitry into one of the two systems, a technique which moves the bottleneck from the interface system but does not remove the bottleneck.

However, in the read handshake operation, the data must be found at some address of the second system before it may be transferred to the requesting system. Consequently, a read handshake operation cannot utilize the same sort of pipeline circuitry used in the write handshake to remove the delay caused by synchronization between two asynchronous systems from the interface. This is true for two reasons. First, as explained, the read data is not immediately available (as is the write information) so the data cannot be immediately transferred. Second, obtaining the data from different addresses may take different lengths of time which may depend on the particular address to be read or may depend on the current status of the read device itself. Data at one address may be available immediately, data at another address may be available in one clock period, data at another address may be available in two clock periods, and so on. In fact, the time in which it takes to obtain certain data may not be even ascertainable until the data has been obtained.

Consequently, it is necessary in prior art interface arrangements to utilize the standard method for synchronizing handshake signals. That is, a read signal is provided by the requesting system, synchronized through two stages of flip-flops, and the system furnishing the data begins to obtain the data in response to the signal. When the data is obtained, it is placed on the data bus for transmitting to the requesting system; and, an acknowledge signal is sent to the requesting system and synchronized through two additional stages of flip-flops.

SUMMARY OF THE INVENTION

It is an object of the present invention to speed the operation of asynchronous interfaces connecting different systems on a computer bus.

It is another object of the present invention to provide asynchronous interface systems for computer buses which operate more rapidly to accomplish a read handshake than do systems of the prior art.

These and other objects of the invention are realized in a read handshake circuitry for an asynchronous bus interface system transferring data between first and second computer systems which comprises means for providing signals to indicate to the second computer system that the first system desires to read data at a specified address of the second system, means for comparing the specified address with addresses of the second system to provide an output indicating the time required to retrieve data from the specified address, and means operative in response to the output indicating the time required to retrieve data for providing a coded signal from the second computer system to the first computer system to indicate to the first computer system the time at which the information will be available for transfer to the first computer system.

These and other objects and features of the present invention will be better understood by reference to the detailed description which follows, taken together with the drawings in which like elements are referred to by like designations throughout the several views.

BRIEF DESCRIPTION OF THE DRAWINGS

FIG. 1(b) is a timing diagram illustrating the signals utilized in the handshake operation for the interface system illustrated in FIG. 1(a).

FIG. 2(b) illustrates a timing diagram showing the signals utilized for accomplishing a handshake in an asynchronous write handshake operation as shown in FIG. 2(a).

FIG. 3(c) illustrates an exemplary coding of signals used in the operation of the interface system shown in FIG. 3(a).

FIGS. 4(a) and 4(b) illustrate the precise manner in which the different delays may be made to fit an interface for systems operating at two different specified clock frequencies.

NOTATION AND NOMENCLATURE

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to apparatus and to method steps for operating a computer in processing electrical or other (e.g. mechanical, chemical) physical signals to generate other desired physical signals.

Throughout this specification where a computer system is referred to, it should be understood that the term is intended to include circuitry often referred to as central processing systems, co-processing systems for assisting central processing systems such as in mathematical manipulations, graphical accelerators, and the like as well as complete independent computer systems.

DESCRIPTION OF THE PREFERRED EMBODIMENT

Figure 1A:
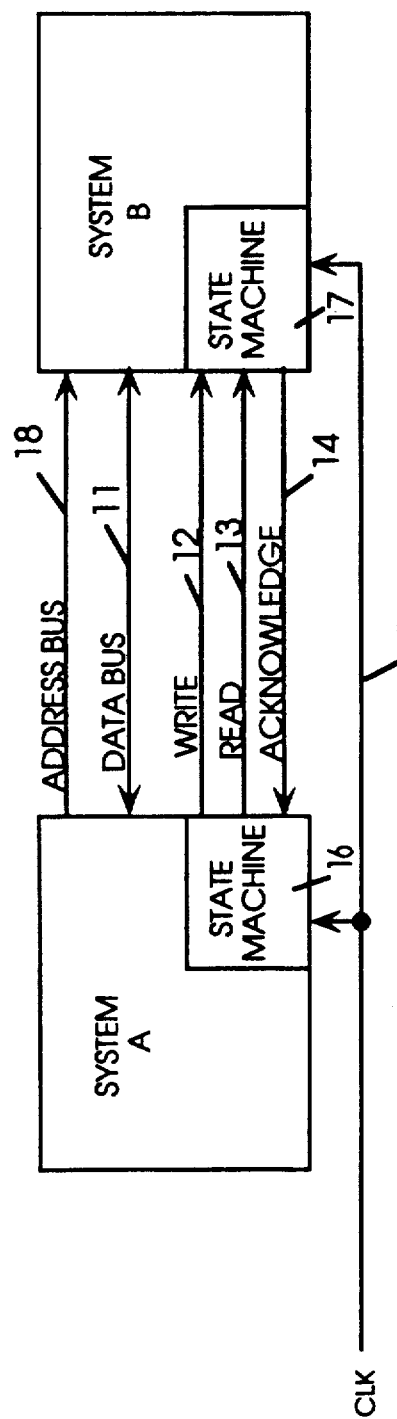
FIG. 1(a) is a block diagram illustrating a prior art interface system for connecting together two systems running synchronously.

FIG. 1(a) is a block diagram illustrating a synchronous interface system for connecting together two systems running on the same clock. System A and System B are connected together by a data bus 11 which, in the preferred embodiment, may comprise thirty-two lines for carrying data. Also connecting system A to system B are a write line 12, a read line 13, and an acknowledge line 14. A system clock appears on line 15 and is furnished to state machines 16 and 17 which control the handshake operation between System A and System B. As used in the present disclosure, state machine refers to a digital logic state machine, a processor such as a central processing unit, or some other circuitry providing control functions. Also shown in FIG. 1(a) is an address bus 18 for conveying addressing information between the systems A and B.

FIG. 1(b) is a timing diagram which illustrates the signals utilized in a typical full handshake read operation. These include a clock signal which is furnished to each of the state machines 16 and 17 of System A and System B on the clock line 15, a read signal provided on the read line 13, and an acknowledge signal provided on the acknowledge line 14. In order to accomplish a read operation in a synchronous system, a read signal is provided by the state machine 16 on the read line 13 following the rising edge of the first clock pulse 100 and the address of the data to be read is placed on the address bus 18. Following the rising edge of the second clock pulse 101, the read signal is sampled by the state machine 17 of System B and the address of the data to be read is read by system B from the address bus 18.

At this point it is necessary for the state machine 17 of the system B to obtain the data from the addressed space. This may take any of a number of different time lengths. For example, data at an address at one point in the system B may require one clock period to obtain while data at another address may require several clock periods. The time required to obtain information at some addresses may not, in fact, be pre-determinable. Once the information has been found, it is transferred onto the data bus 11. In FIG. 1(b) the varying time required to obtain the data and place it on the data bus 11 is indicated by the broken lines in the latter portion of the second clock period 101.

On the rising edge of what is shown in FIG. 1(b) as the third clock pulse 107, an acknowledge signal is sent indicating data has been placed on the data bus 11 and is ready to be read by the system A. The acknowledge signal is read by the state machine 16 of system A on the leading edge of the next clock pulse 108 allowing the termination of the read signal to occur. Finally, the acknowledge signal may be terminated following the leading edge of the next clock pulse 109.

Figure 2A:
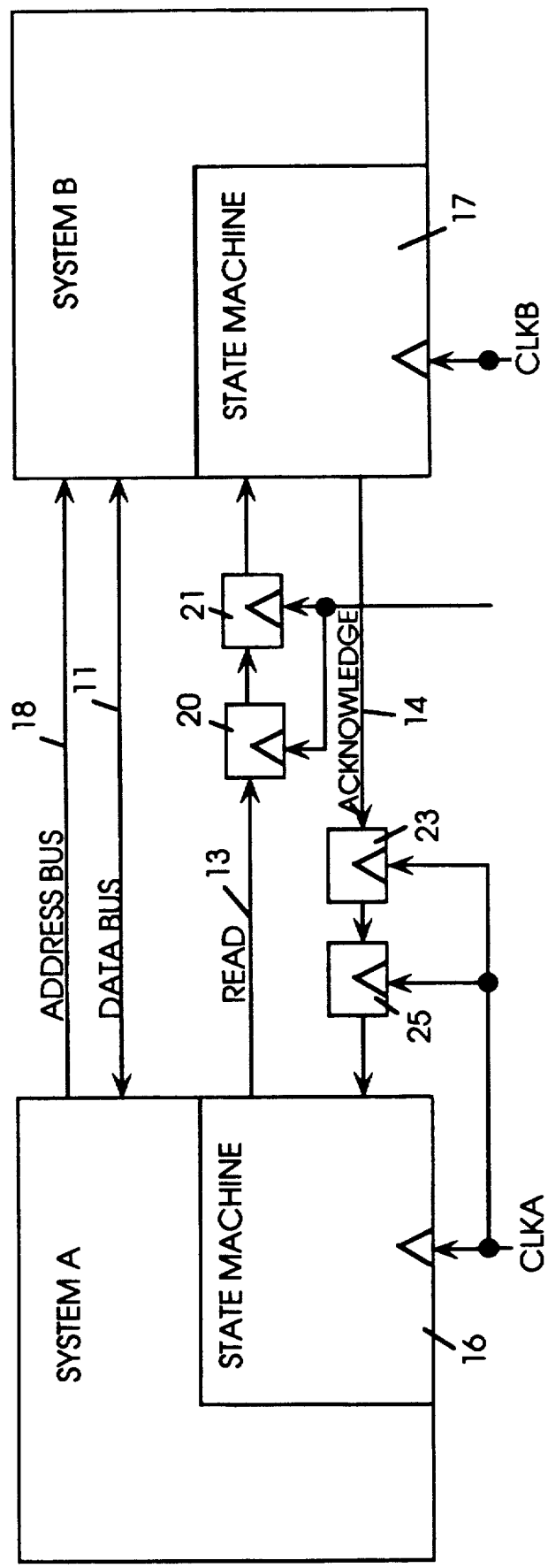
FIG. 2(a) illustrates in block diagram form prior art circuitry for accomplishing the transfer of information in the handshake operation in between two asynchronous systems.

FIG. 2(a) illustrates in block diagram form the typical circuitry in the prior art for accomplishing the read handshake operation between two asynchronous systems, i.e., systems running on different system clocks. In FIG. 2(a), system A operates in a response to a first clock A while system B operates in response to a second clock B. System A is joined to system B by a data bus 11 and an address bus 18, and has read line 13 and acknowledge line 14 for accomplishing the read handshake between the two systems. Also included in the normal interface but not shown in FIG. 2(a) is identical circuitry for accomplishing the read handshake operation in an opposite direction; since the operation is the same, only circuitry for transferring in one direction is illustrated.

Because the two systems A and B are driven by two different clocks so that signals which are sent from system A appear at one rate but can be used at system B only at a second rate and vice versa, it is necessary to synchronize the signals transferred between the two systems to the clocks of the receiving systems. In order to accomplish the synchronization of the read handshake signals between the two systems A and B, a pair of flip-flops are used in each handshake line. In operation, the state machine 16 of system A places a read signal on read line 13. The read signal on read line 13 is transferred to the input of a first flip-flop 20 which is driven by clock B. The output of the flip-flop 20 is transferred to flip-flop 21 which is also driven by clock B and then to the state machine 17 of system B.

The data is accessed and placed on the data bus 11, and an acknowledge signal is placed on the acknowledge line 14. The acknowledge signal from the state machine 17 of system B are furnished to a first flip-flop 23 driven by clock A. The output of the flip-flop 23 is furnished to a flip-flop 25 which is also driven by clock A and furnishes an output to the state machine 16 of the system A.

FIG. 2(b) illustrates a timing diagram showing the signals utilized for accomplishing a handshake in an asynchronous full handshake read operation between system A and system B of the prior art. The signals shown are clock A, the read signal, clock B, the acknowledge signal, the address information, and the data information.

On the rising edge of the first clock pulse 200 of clock A, the read signal from state machine 16 is driven active on the read line 13. On the second clock pulse 251 of clock B, the read pulse is provided to the first flip-flop 20 which attempts to assume a set state. In fact, the particular state the flip-flop 20 actually takes will depend on the timing of the appearance of the read signal and the B clock pulse. If there is sufficient set-up and hold time for the incoming read signal to stabilize at the input to the flip-flop 20 when the clock pulse is received, the flip-flop 20 will set; and the read signal will be synchronized with the clock of the system B. However, depending on the time at which the clock pulse is received and the value of the incoming read signal at that instant, the first flip-flop 20 may, in fact, assume a metastable condition, switching erratically between the two possible states and finally settling into one of the states. Ultimately, it will assume one or the other of its two states. If this is the correct set state, the read signal will be synchronized with the clock of the system B producing an output to set the flip-flop 21. If not, the next clock will set the flip-flop 20 and synchronize the read signal although one additional clock period has been used.

Whatever the condition of the flip-flop 20, on the rising edge of the third clock pulse 252 of clock B, the output of the flip-flop 20 responding to the read signal provides an output to place the second flip-flop 21 into the same state. Thus, the flip-flop 21 is arranged in the path in order to isolate any erratic switching of the state of the flip-flop 20 from the state machine 17 of the receiving system B. As may be seen, the use of two stages of flip-flops to receive the handshake signals adds at least two additional clock periods to each step of the synchronization in an asynchronous interface designed in accordance with the prior art.

Assuming flip-flop 20 was able to set after the rising edge of clock pulse 251 of clock B, after the rising edge of the third clock pulse 252 of clock B, the read signal is synchronized to the clock of system B, and the state machine B may sample the read line. The address of the data to be read, placed on the address bus 18, may now be read by system B.

At this point, as with a synchronous system, it is necessary for the state machine 17 of the system B to obtain the data from the addressed space. This may take any of a number of different time lengths. In FIG. 2(b) the time required for this operation is considered to fall within the period between the broken lines after the third clock period 252 of clock B. Once the information has been found, it is transferred onto the data bus 11.

When the information is placed on the data bus 11, the acknowledge signal may be sent. The acknowledge signal is provided by the state machine 17 to the first flip-flop 23 on the acknowledge line 14. The diagram presumes on the rising edge of the clock pulse 207 of clock A successfully sets flip-flop 23 and the second flip-flop 25 on the rising edge of the clock pulse 208 of clock A. At this time, the acknowledge signal is considered synchronized with the clock A of system A. Finally, on the rising edge of the clock pulse 209 of clock A, the acknowledge signal may be sampled by the state machine 16 of system A and the read pulse driven negative (deasserted) on the read line 13.

When the read signal is deasserted on the read line 13, it will cause the first flip-flop 20 to attempt to assume a correct state (as explained above) on the rising edge of the clock pulse 259 of clock B and the second flip-flop 21 to assume a correct state on the rising edge of the clock pulse 260 of clock B to synchronize the deassertion of the read signal with clock B. Finally, on the rising edge of the clock pulse 261 of clock B, the state machine 17 may deassert the acknowledge signal on the acknowledge line 14. The deassertion of the acknowledge signal causes the attempted change of state of the flip-flop 23 on the rising edge of the clock pulse 214 of clock A and a change of state of flip-flop 25 on the rising edge of the clock pulse 215 of clock A. Finally, the state machine 16 of system A samples the deassertion of the acknowledge signal on the rising edge of clock pulse 216 of clock A.

It will be understood by those skilled in the art reviewing the typical operation of the prior art interface system just described for connecting asynchronous systems to transmit information to one another, that the full handshake read operation for such an asynchronous system requires a substantial period of time, much longer than the time required for accomplishing the same full handshake operation in a synchronous system.

The transfer of information to accomplish a write operation requires essentially the same operations as does the read operation insofar as the handshake signals are concerned. The only real difference in the two interface operations is in the transfer of data. In a write operation, the data is immediately available for transfer from system A to system B while in the read operation, the data must be found at some address of system B and then is transferred from system B to system A.

Because the information is immediately available in the write operation, various circuitry has been proposed to eliminate some of the delay found in the write handshake operation. However, a read operation cannot utilize such circuitry to eliminate the delay necessary to synchronize the handshaking operation between two asynchronous systems for two reasons. First, the data to be read is not immediately available as is data to be written so it cannot be immediately transferred. Second, obtaining the data from different addresses which may be read in system B takes different lengths of time which depend on the particular address and device state. Data at one address may be available immediately, data at another address may be available in one clock period, data at another address may be available in two clock periods, and the time to obtain data at some addresses may not be pre-determinable. For this reason, it is necessary in prior art interface arrangements to utilize the standard method for synchronizing read handshake signals. That is, a read signal is provided by the system A, synchronized through two stages of flip-flops, and sampled by system B. System B then reads the address and begins to obtain the data in response to the signal. When the data is obtained by system B, it is placed on the data bus to system A, and an acknowledge signal is sent to system A and synchronized through two stages of flip-flops. Later the deassertion of the read and the acknowledge signals must each again be synchronized through two stages of flip-flops.

Figure 3A:
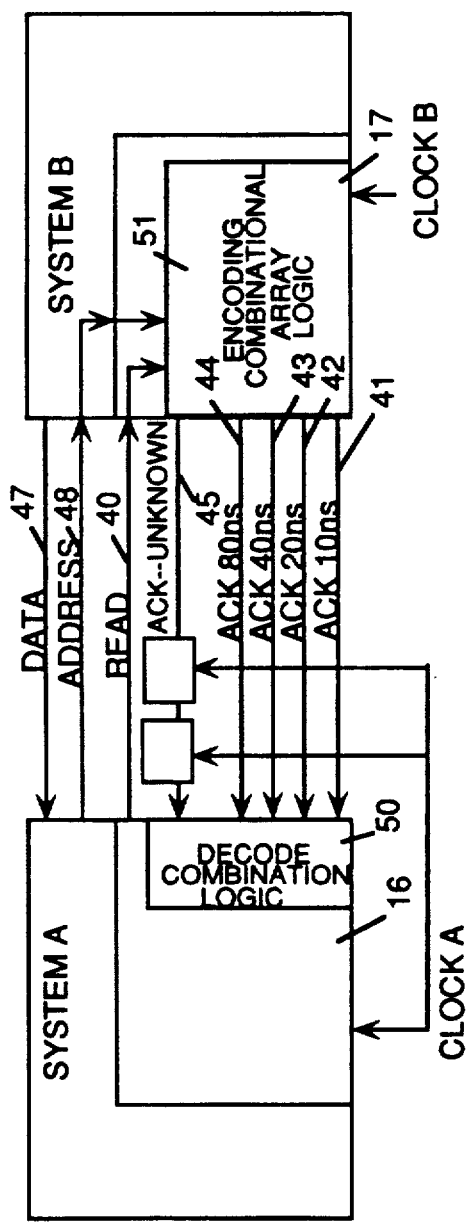
FIG. 3(a) illustrates in block diagram form an interface system constructed in accordance with the present invention.

This invention provides a new arrangement for dealing with the delay problem posed by the read handshake where there are two asynchronous systems communicating with one another. First, the system eliminates most of the delay caused by the synchronization of the two systems to the two different clocks. Second, the system handles the reading of information from an addressed system having different known delays. Third, the system provides an arrangement for dealing with unknown delay periods during a read operation. FIG. 3(a) illustrates an arrangement in block diagram form constructed in accordance with the invention. The arrangement includes a first system A which operates on a first clock A, a second system B which operates on a second clock B, a read line 40, a data bus 47, an address bus 48, and a plurality of acknowledge lines 41-45.

Each of the individual acknowledge lines 41-44 may carry a zero or a one bit. Rather than constructing the synchronization in a manner in which each signal is synchronized to the clock of the receiving system as it arrives, the present system stores the addresses of the second system and the known times for retrieval associated with each of such addresses, compares the address on the bus with the stored addresses to generate a signal indicating the time for retrieval of data at the particular address, transmits coded signals indicating those times to the sending system, decodes the signals representing the delays so that the receiving system may be prepared at the indicated time to receive the information, and provides standard synchronization for those few addresses the time for retrieval of information from which is unknown.

More particularly, in a preferred embodiment each read signal sent by the state machine 16 of the system A on the line 40 is directed to an encoding combinational array logic circuit 51 in the state machine of system B. The address transferred on the address bus 48 from system A to system B is also directed to the encoding combinational array logic circuit 51. Almost all addresses of system B will (in the usual case) have known time delays for the retrieval of information in response to a read request. As pointed out above, some of these delays may be short while others are long. The encoding combinational array logic circuit 51 of system B receives the address sent on the address bus 48 and the read signal and generates an encoded delay for the particular address. This delay is sent on the acknowledge lines 41 through 44 to the state machine 16 as a coded response indicating the specified delay time. It is decoded by decode combinational logic circuit 50 residing in state machine 16. At the time specified by the coded response, the data at the addressed position will have been placed on the data bus 47 and may be immediately utilized by system A if state machine 116 determines from the decoded delay that the read data has sufficient setup time to clock A.

Figure 3B:
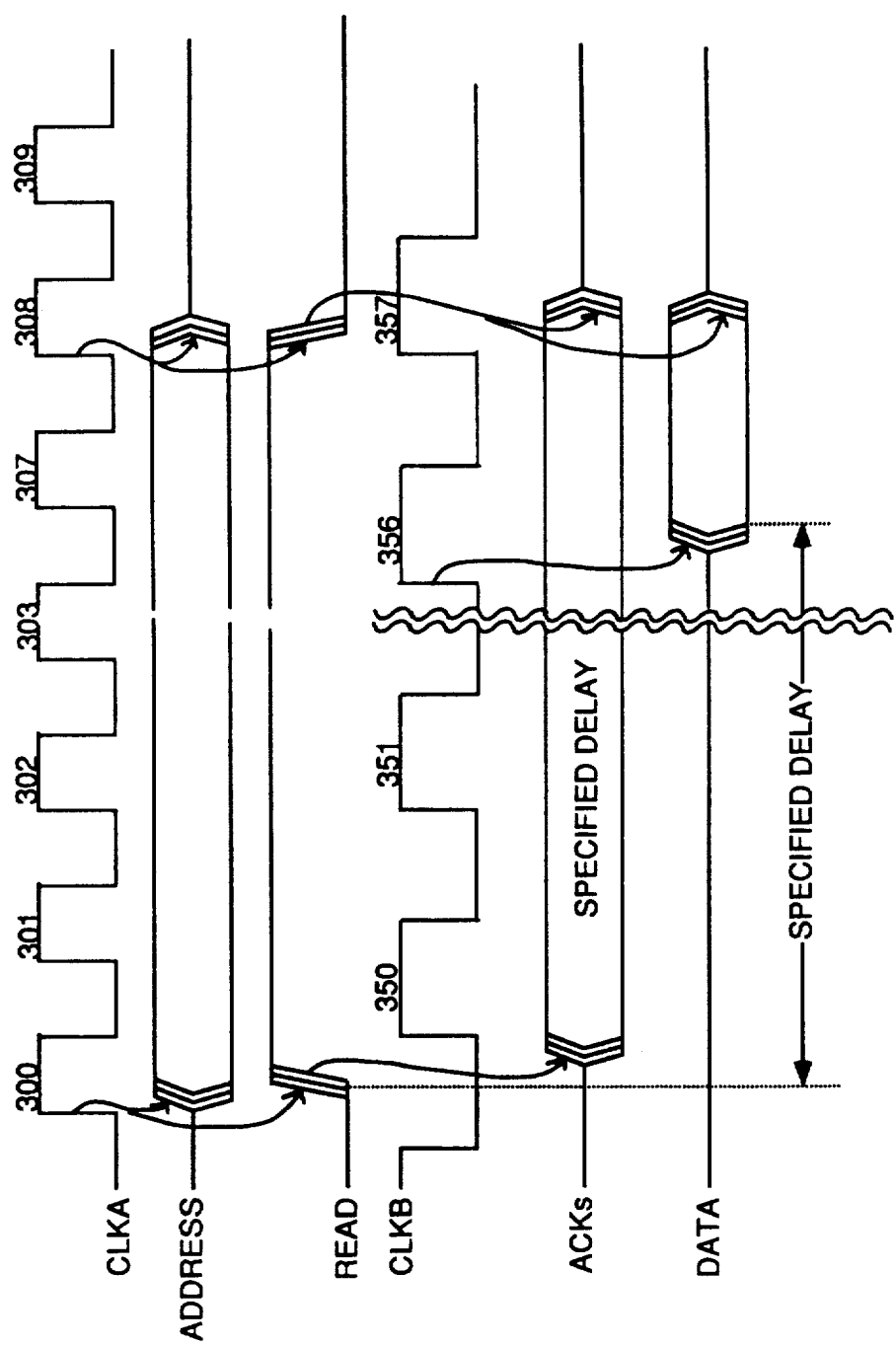
FIG. 3(b) illustrates a timing diagram for the operation of the interface system shown in FIG. 3(a).

FIG. 3(b) illustrates a timing diagram illustrating the clock A, clock B, address and data information, the read pulse, and the acknowledge signal as they appear on the specified lines of the interface between systems A and B. At the rising edge of clock pulse 300 of clock A, the address is placed on the address bus 48 and the read signal is asserted on the read line 40 by the state machine 16 of system A. The read signal and the address are connected to encoding combination logic circuit 51. The logic circuit 51 generates the coded acknowledge signals which are immediately placed on the lines 41-44 at the state machine 17 of system B. In effect, the address on the address bus 48 and the read signal together generate the encoded acknowledge signals specifying the delay for the specified address. These are placed on the acknowledge lines 41-44 and within a single clock period of clock A cause the decode combinational logic 50 of the state machine 16 to provide to the state machine 16 the specific delay for the address.

Consequently, at the rising edge of clock pulse 301 of clock A, the state machine 16 may sample the output of the decode combinational logic 50 so that it knows the time at which the data will be available on the data bus 47. After the specified delay (shown below the data signal in FIG. 3(b)), the data is placed on the data line 47 in response to the rising edge of clock pulse 356 of clock B. At clock pulse 307 of clock A, the data is read by system A; and, at clock pulse 308 of clock A, the address and the read signals are deasserted. Since these are directly connected through the combinational logic of the circuit 51, the acknowledge signals are removed from the acknowledge lines 41-44. At the same time, the data is removed from the data bus 47. It should be noted that at no time has it been necessary to utilize the clock B pulses at all in accomplishing the synchronization except in clocking the data onto the data bus 47.

FIG. 3(c) illustrates an exemplary coding of the signals appearing on the lines 41-44 in order to specify the particular delays. In a preferred embodiment, if zeros appear on each of lines 41-44, then the time for the retrieval of information for transfer to system A is unknown. This coded information signifies to the system A that synchronization will require that the usual form of two flip-flop synchronization be accomplished between system A and B by the line 45. As pointed out above, the unknown delay situation is an unusual situation and will occur infrequently in the usual operation of synchronizing two computer systems. The method and signals for accomplishing such a synchronization are in accordance with the description provided for FIGS. 2(a) and 2(b).

If on the other hand, the delay to obtain the data to be written requires ten nanoseconds, then the combinational logic circuit 51 will generate and cause a one to appear on line 41 and zeros to appear on lines 42–44 to indicate this. A one appearing on line 42 and zeroes on the other lines will indicate that the delay is twenty nanoseconds, ones on lines 41 and 42 and zeroes on the other lines will indicate a thirty nanosecond delay, a one on line 43 and zeroes on the other lines will indicate a forty second nanosecond delay, and so on. It will be noted that using this exemplary coding arrangement with delays spaced by ten nanoseconds allows retrieval times from ten nanoseconds to one hundred fifty nanoseconds to be specified by four acknowledge lines.

It will be obvious to those skilled in the art that by varying the number of lines available for transmitting the coded acknowledge information or by changing the meaning of the particular intervals from, for example, ten nanoseconds to five nanoseconds, a variety of different delays may be obtained to fit any particular interface arrangement. For example, by adding more lines to signify positions at one hundred sixty and three hundred twenty nanoseconds, much slower systems may be handled. By adding lines to signify five nanoseconds and below, much faster systems may be handled. Furthermore, providing lines to signify lesser time delays allows individual delays to be more precisely selected to fit more exactly to the exact clock cycles utilized by the sending and receiving systems to eliminate more of the system time loss. In any case, the arrangement provides for immediate synchronization of information read between asynchronous systems without the need for double flip-flop synchronization of the handshake operation; and therefore substantially accelerates the speed of the interface.

Obviously, such an encoding arrangement may be provided for transferring information to be read by system B from system A; and the same details would be included in such a system.

FIGS. 4(a) and 4(b) illustrate the precise manner in which the different delays may be made to fit two different clock cycles, one of thirty-three nanoseconds per clock period and another of forty-three nanoseconds per clock period. For example, if a single clock period of thirty-three nanoseconds is necessary to obtain data at a particular address, a forty nanosecond delay is signalled on the acknowledge lines 41–44. If two clock periods of thirty-three nanoseconds are necessary to obtain data, a delay of seventy nanoseconds is signalled on the acknowledge lines 41–44. In like manner, if one clock period of forty-three nanoseconds is necessary to obtain addressed data, a delay of fifty nanoseconds is signalled by the acknowledge lines 41–44. Thus, it will be obvious how close the individual delays signalled on the acknowledge lines 41–44 may be adjusted to the individual clock frequencies of the reading system. It will be understood by those skilled in the art that the time required to generate the encoded acknowledge signals through circuit 51 and to decode those signals through circuit 50 using the combinational logic of those circuits must be taken into consideration in implementing specific hardware to accomplish this invention so that the round trip combinational delay is less than one clock period. This allows state machine 16 to be able to use the acknowledged delay information in a synchronous manner.

It should be noted that it is a special advantage to provide a system which may be so closely adjusted yet will allow the two systems to run on independent clocks. This allows an individual computer module which is to be connected to a bus by such a read handshake interface to be programmed to accept different systems without having to be revised to operate with other systems. All that is necessary is that the significance of the individual acknowledge lines and the signals sent on the acknowledge lines be variable for a module containing the handshake circuitry to easily fit to any other system whether the delays and the clocks for those systems are long or short.

Although the invention has been described with reference to particular arrangements and systems, the details of those arrangements are used for illustrative purposes only and should not be considered to limit the invention. It is, thus, to be contemplated that many changes and modifications may be made by those of ordinary skill in the art without departing from the spirit and scope of the invention. The invention should therefore be considered only in terms of the claims which follow.

What is claimed is:

1. An interface for transferring data on a bus between a first computer system and a second computer system, said first computer system operating in accordance with a first clock and said second computer system operating in accordance with a second clock, said first and second clocks asynchronous to one another, said interface comprising:

means for providing signals from the first computer system to the second computer system to indicate to the second computer system that the first computer system requests to read data located at a specified address of the second computer system;

determining means, coupled to the second computer system to receive the specified address, for determining the amount of time required for the second computer system to retrieve the requested data at the specified address;

means coupled to the determining means for providing a coded signal to the first computer system indicating the amount of time required for the second computer system to retrieve the requested data and place the requested data on the bus;

said first computer system retrieving the requested data at a time indicated by the coded signal without waiting for a handshake signal generated by the second computer system indicating that data is available on the bus, thereby eliminating the wait time required for the second computer system's handshake signal, indicating that the data requested is available on the bus, to reach the first computer system.

2. The interface for transferring data as set forth in claim 1, wherein the means for providing signals comprises a read line and an address bus coupled between the first computer system and second computer system.

3. The interface for transferring data as set forth in claim 1, wherein the determining means comprises combinational logic which determines from the specified address the amount of time required for the second computer system to retrieve the requested data and generates the coded signal for providing to the first computer system to indicate the amount of time required for the second computer system to retrieve the requested data and place the requested data on the bus.

4. The interface for transferring data as set forth in claim 3, wherein,
said determining means further comprises means for storing identification of data addresses available in the second computer system and the corresponding amount of time required to retrieve data located at each of the data addresses;
said combinational logic comparing the specified address to the identification of data addresses to determine the corresponding amount of time required to retrieve the data located at the specified address.

5. The interface for transferring data as set forth in claim 4, wherein,
certain of said data addresses having corresponding times required to retrieve the data which are not ascertainable,
said means for providing a coded signal providing a coded signal indicating that the time is not ascertainable, and
said first computer system waiting for a handshake signal indicating that data is available on the bus before retrieving the data requested from the bus.

6. The interface for transferring data as set forth in claim 1, wherein,
said means for providing a coded signal comprises a plurality of signal lines coupled between the first computer system and second computer system for transferring the coded signals from the second computer system to the first computer system;
said first computer system further comprising means for decoding the coded signal to determine the time at which the first computer system can retrieve the requested data from the bus.

7. The interface for transferring data as set forth in claim 1, wherein the coded signal is provided within one first clock cycle from when signals are provided to read data located at a specified address of the second computer system.

8. An interface for transferring data on a bus between a first computer system and a second computer system asynchronous to one another, comprising:
a read signal line and address bus lines coupled between the first computer system and second computer system, for the first computer system to request to read data located at a specified address of the second computer system;
data bus lines coupled between the first computer system and second computer system for transferring data between the first computer system and second computer system;
encoding logic means coupled to the second computer system for receiving the specified address and determining the amount of time required for the second computer means to retrieved the requested data and output the data to the data bus lines and generating a code indicative of the amount of time;
a plurality of acknowledge lines coupled between the first computer system and second computer system for communicating the code from the encoding logic means to the first computer system;
decoding logic means coupled to the first computer system for decoding the code to identify the amount of time required for the second computer means to retrieved the requested data and output the data to the data bus lines;
said first computer system retrieving the requested data at a time indicated by the code transmitted across the acknowledge signal lines without waiting for a handshake signal generated by the second computer system indicating that data is available on the bus, thereby eliminating the wait time required for the second computer system's handshake signal, indicating that the data requested is available on the bus, to reach the first computer system.

9. A method for transferring data on a bus between a first computer system and a second computer system, said first computer system operating in accordance with a first clock and said second computer system operating in accordance with a second clock, said first and second clocks asynchronous to one another, said interface comprising the steps of:
providing signals from the first computer system to the second computer system to indicate that the first computer system requests to read data located at a specified address of the second computer system;
determining the amount of time required for the second computer system to retrieve the requested data at the specified address;
providing a coded signal to the first computer system indicative of the amount of time required for the second computer system to retrieve the requested data at the specified address and place the requested data on the bus; and
said first computer system retrieving the requested data from the bus at a time indicated by the coded signal without waiting for a handshake signal to be issued by the second computer system indicating that the requested data is available on the bus;
whereby the wait time required for the second computer system's handshake signal, indicating that the data requested is available on the bus, to reach the first computer system is eliminated.

10. The method for transferring data on a bus as set forth in claim 9, wherein the step of determining the amount of time required for the second computer system to retrieve the requested data at the specified address comprises the steps of:
storing a table of addresses and the corresponding retrieval times for each address; and
indexing the table according to the specified address to retrieve the amount of time required for the second computer system to retrieve the requested data at the specified address.

11. The method for transferring data on a bus as set forth in claim 9, wherein the coded signal is provided within one first clock cycle from when signals are provided to read data located at a specified address of the second computer system.

12. The interface for transferring data as set forth in claim 9, wherein,
certain of said addresses having corresponding times required to retrieve the data which are not ascertainable,
said step for providing a coded signal providing a coded signal indicating that the time is not ascertainable, and
said first computer system waiting for a handshake signal indicating that data is available on the bus before retrieving the data requested from the bus.

* * * * *